(12) United States Patent
Omatsu et al.

(10) Patent No.: US 7,657,090 B2
(45) Date of Patent: Feb. 2, 2010

(54) REGION DETECTING METHOD AND REGION DETECTING APPARATUS

(75) Inventors: Shigeru Omatsu, Sakai (JP); Yasue Mitsukura, Okayama (JP); Minoru Fukumi, Komatsushima (JP); Kensuke Mitsukura, Okayama (JP); Koji Kita, Wakayama (JP); Kouichi Kugo, Wakayama (JP)

(73) Assignee: Noritsu Koki Co., Ltd., Wakayama (JP)

( * ) Notice: Subject to any disclaimer, the term of this patent is extended or adjusted under 35 U.S.C. 154(b) by 704 days.

(21) Appl. No.: 10/853,706

(22) Filed: May 26, 2004

(65) Prior Publication Data

US 2004/0264741 A1 Dec. 30, 2004

(30) Foreign Application Priority Data

May 26, 2003 (JP) ............................. 2003-148069

(51) Int. Cl.
*G06K 9/34* (2006.01)
*G01N 33/48* (2006.01)

(52) U.S. Cl. ........................................ 382/173; 702/19
(58) Field of Classification Search .................. 382/173
See application file for complete search history.

(56) References Cited

U.S. PATENT DOCUMENTS

| 5,214,746 | A | * | 5/1993 | Fogel et al. ................... 706/25 |
| 5,878,156 | A | * | 3/1999 | Okumura ..................... 382/118 |
| 2002/0196350 | A1 | * | 12/2002 | Cooper .................... 348/223.1 |
| 2003/0007687 | A1 | * | 1/2003 | Nesterov et al. ............. 382/167 |
| 2003/0014444 | A1 | * | 1/2003 | Wu ............................. 707/515 |
| 2003/0093227 | A1 | * | 5/2003 | Stoughton et al. ............. 702/20 |
| 2003/0099376 | A1 | * | 5/2003 | Kim et al. .................... 382/103 |
| 2003/0198402 | A1 | * | 10/2003 | Zhang et al. ................ 382/276 |

OTHER PUBLICATIONS

Fast Face Detection System for Time-Varying Images Using the GA-Threshold Method, Proceedings of the IASTED International Conference, Feb. 18, 2004, p. 89-92.*
The Multimodal Neighborhood Signature for Modeling Object Color Appearance and Applications in Object Recognition and Image Retrieval, Computer Vision and Image Understanding 88, 2002, p. 1-23.*

(Continued)

*Primary Examiner*—Bhavesh M Mehta
*Assistant Examiner*—David P Rashid
(74) *Attorney, Agent, or Firm*—Smith Patent Office

(57) ABSTRACT

To provide a region detecting method capable of setting a proper threshold independently of a photographing condition and moreover, quickly and accurately detecting a specific region, which uses an image data storing section 10 for storing a sample image 12 and a purposed image 11, a first computing means 1 for obtaining the extraction-region-identifying threshold data for a plurality of sample images including a common extraction region but having average color values different from each other in accordance with a genetic algorithm and generating a threshold table 8 for the average color values, a second computing means 2 for adaptively computing the extraction-region-identifying threshold data for the purposed image 11 in accordance with the average color value of the purposed image and the threshold table 8, and a third computing means 3 for detecting an extraction region in accordance with the threshold data computed by the second computing means 12.

3 Claims, 7 Drawing Sheets
(1 of 7 Drawing Sheet(s) Filed in Color)

OTHER PUBLICATIONS

Mitsukira, Y., et al. "Fast Face Detection System for Time-Varying Images Using The GA-Threshold Method", Proceedings of the IASTED International Conference, Applied Informatics, International Symposium on Artificial Intelligence and Applications, Feb. 18, 2002, pp. 89-92, ACTA Press, Anaheim CA, USA.

Jinsong, C. et al. "Entropic Thresholding Method Using Generic Algorithm", Geoscience and Remote Sensing Symposium, lgarss' 99 Proceedings, Jun. 28, 1999, pp. 1247-1249, IEEE.

Yin, P-Y., "A Fast Scheme for Optimal Thresholding Using Genetic Algorithms", Signal Processing, Jan. 19, 1999, pp. 85-95, vol. 72, No. 2, Elsevier Science B.V., Amsterdam, NL.

Y. Mitsukira, et al. "A Detection Method of Face Region in Color Images by Using the Lip Detection Neural Network and the Skin Distinction Neural Network", The Transactions of The Institute of Electrical Engineers of Japan, 2001, pp. 112-117, vol. 121-C, No. 1.

* cited by examiner

RGB closest to lip color for average color value Y

Characteristic straight line of RGB closest to lip color for average color value Y

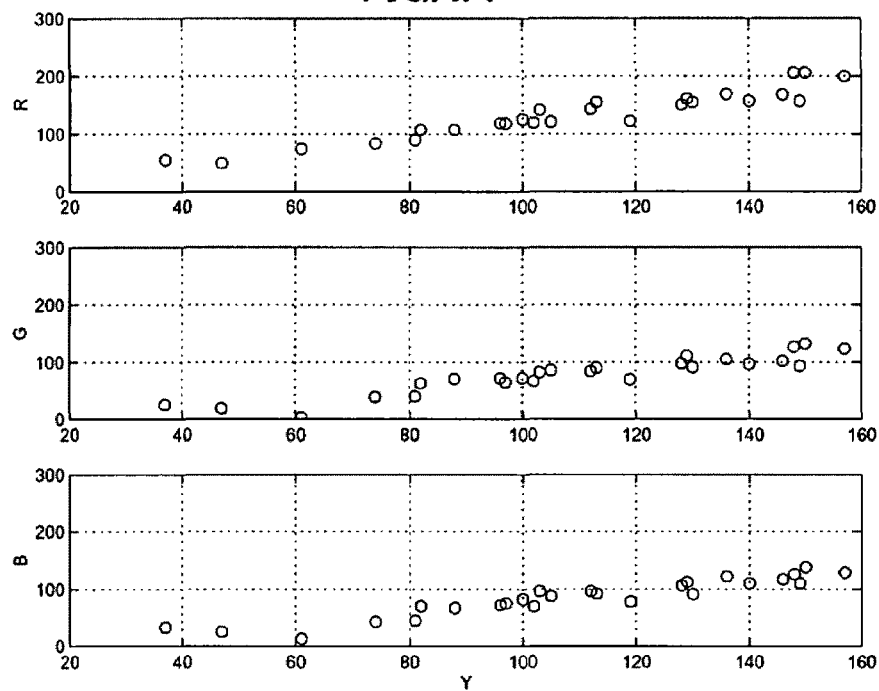
RGB closest to skin color for average color value Y
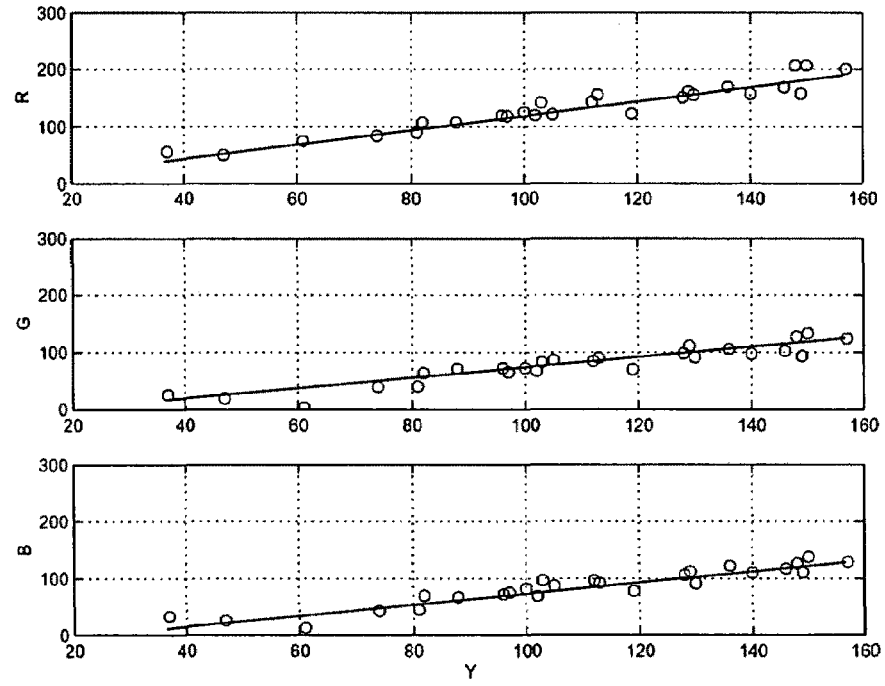
Characteristic straight line of RGB closest to skin color for average color value Y

FIG.6A

First generation   First individual

I (1,1)= | Rl1 | Gl1 | Bl1 | Rs1 | Gs1 | Bs1 |

FIG.6B $k^{th}$ generation   $m^{th}$ individual          Adaptability i

I (k,m)  | Rlm | Glm | Blm | Rsm | Gsm | Bsm |

$k^{th}$ generation   $n^{th}$ individual          Adaptability j

I (k,m)  | Rln | Gln | Bln | Rsn | Gsn | Bsn |

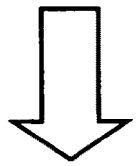

$k+1^{th}$ generation   $p^{th}$ individual

I (k+1,m) | Rlp | Glp | Blp | Rsp | Gsp | Bsp |

$Rlp = j \cdot (Rlm + Rln) / (i+j)$
$Glp = j \cdot (Glm + Gln) / (i+j)$
$Blp = j \cdot (Blm + Bln) / (i+j)$
$Rsp = j \cdot (Rsm + Rsn) / (i+j)$
$Gsp = j \cdot (Gsm + Gsn) / (i+j)$
$Bsp = j \cdot (Bsm + Bsn) / (i+j)$

REGION DETECTING METHOD AND REGION DETECTING APPARATUS

This application is based on Japanese Patent Application No. 2003-148069 filed on May 26, 2003, the contents of which are incorporated hereinto by reference.

BACKGROUND OF THE INVENTION

1. Field of the Invention

The present invention relates to a region detecting method and a region detecting apparatus for detecting a predetermined region to be extracted from a purposed image, particularly to a region detecting method and a region detecting apparatus for extracting the face of a person from a photographic image or the like.

2. Description of the Related Art

In recent years, an image processing method is proposed which automatically extracts a specific region from a photographic image. Particularly to extract a face region of a person, the method is widely used to count personal images. As an image processing technique for these personal images is developed, it is requested not only to perform accurate recognition but also to quickly retrieve the face region and moreover identify a person.

As the above-mentioned face-region detecting method, the following methods are proposed: a method for using a threshold for determining the face region from a purposed image and detecting the face region in accordance with the threshold and a method for deciding the region of a face by using a neural network and thereby extracting a skin color.

However, the method for using the threshold of a skin color for determining the face region from a purposed image and detecting the face region in accordance with the threshold has the following problems. Although high-speed retrieval can be made, it is difficult to decide a threshold, when a skin color is included in background colors. Not only erroneous recognition occurs but also the recognition rate depends on the race of the individual. Thus, erroneous recognition occurs depending on the photographing conditions for an object, and the recognition rate can be lowered.

However, the method for deciding the region of a face by using a neural network and thereby extracting the skin color has a problem that a lot of time is required for recognition when attaching importance to accuracy but the recognition rate extremely lowers when attaching importance to speed because there is a trade-off relation between improvement of the recognition rate and time required for retrieval.

Thus, the inventor of this application proposed a method for detecting a lip and then starting retrieval of the position of a face when the skin color around the lip can be confirmed by paying attention to a lip whose color information does not greatly depend on a race for extraction of a face and using the feature that a skin color is present around the lip in "A Detection Method of Face Region in Color Images by Using the Lip Detection Neural Network and the Skin Distinction Neural Network" in The Transactions of The Institute of Electrical Engineers of Japan, 2001, Vol. 121-C, No. 1, pp. 112-117. However, because the above method is a method for determining a lip/skin color one pixel by one pixel by using a neural network, the method also has problems that it takes a lot of time to obtain a high recognition rate and it is difficult to apply the method to a dynamic image or practically use the method.

SUMMARY OF THE INVENTION

To solve the above-mentioned problems, it is an object of the present invention to provide a region detecting method and a region detecting apparatus capable of setting a proper threshold independently of a photographing condition and quickly and accurately detecting the specific region such as the face region.

To achieve the above object, a region detecting method of the present invention uses a region detecting method based on a threshold genetic deciding method which comprises a first step of obtaining extraction-region-identifying threshold data for a plurality of sample images including a common extraction region but having average color values different from each other in accordance with a genetic algorithm, a second step of adaptively computing extraction-region-identifying threshold data for purposed images in accordance with the average color value of the purposed images and a relation between the thresholds and the average color values obtained in said first step, and a third step of detecting an extraction region in accordance with the threshold data computed in said second step.

The first step comprises a threshold data group generating step. This step involves initially generating threshold data groups constituted by at least RGB threshold data for a first color-component region for characterizing extraction regions as said extraction-region-identifying threshold data and RGB threshold data for a second color-component region adjacent to the first color-component region respectively, an adaptability evaluating step of evaluating adaptabilities of the sample images of the generated threshold data group, a gene processing step of generating a new threshold data group by performing selection in accordance with the evaluated adaptability and executing a crossing or mutating genetic engineering, and a generation alternating step of repeating said gene processing step and said adaptability evaluating step over set generations.

To apply a genetic algorithm, it is possible to aim at improvement of the recognition rate according to a color combination by setting at least RGB threshold data for a first color-component region and RGB threshold data for a second color-component region adjacent to the first color-component region for characterizing extraction regions as said extraction-region-identifying threshold data as genes.

Moreover, in the above-mentioned gene processing step, it is preferable to execute the genetic engineering for selecting a predetermined number of threshold data groups starting with a threshold data group having the highest adaptability in accordance with the elite strategy up to a predetermined number of generations less than a preset number of generations.

Moreover, in said gene processing step, it is possible to realize early convergence while preventing a local solution from occurring by selecting threshold data groups so that adaptabilities show a predetermined probability distribution, preferably a normal distribution in generations after a preset number of generations.

In the above-mentioned gene processing step, it is preferable to generate threshold data group using a value for which each threshold data for said crossing or a pair of threshold data groups is obtained by the inverse ratio of adaptabilities as a new threshold because it is possible to generate threshold data group having a higher adaptability.

The above series of processings are superior because it is possible to accurately and quickly detect a personal face region when said extraction region is the personal face region, the first color-component region is a region corresponding to the color of a lip, and the second color-component region is a region corresponding to a skin color.

Moreover, another invention will be clearly shown by referring to the following embodiment.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4A is an illustration showing graphs of thresholds of RGB for an average color value obtained by a GA (genetic algorithm);

FIG. 4B is an illustration showing graphs of characteristic straight lines of RGB to be entered as the table data at that time;

FIGS. 6A and 6B are illustrations of threshold data groups used in a GA (genetic algorithm)

DESCRIPTION OF THE PREFERRED EMBODIMENT

The region detecting method and the region detecting apparatus of the present invention are described below referring to the accompanying drawings.

A region detecting apparatus based on a threshold genetic deciding method of the present invention is constituted by a computer provided with a CPU board for executing various jobs, an image-data input/output interface section, a hard disk in which image data is stored, and a RAM board serving as a work area in which image data is processed and an application program installed in the computer to execute a desired processing.

Figure 1:
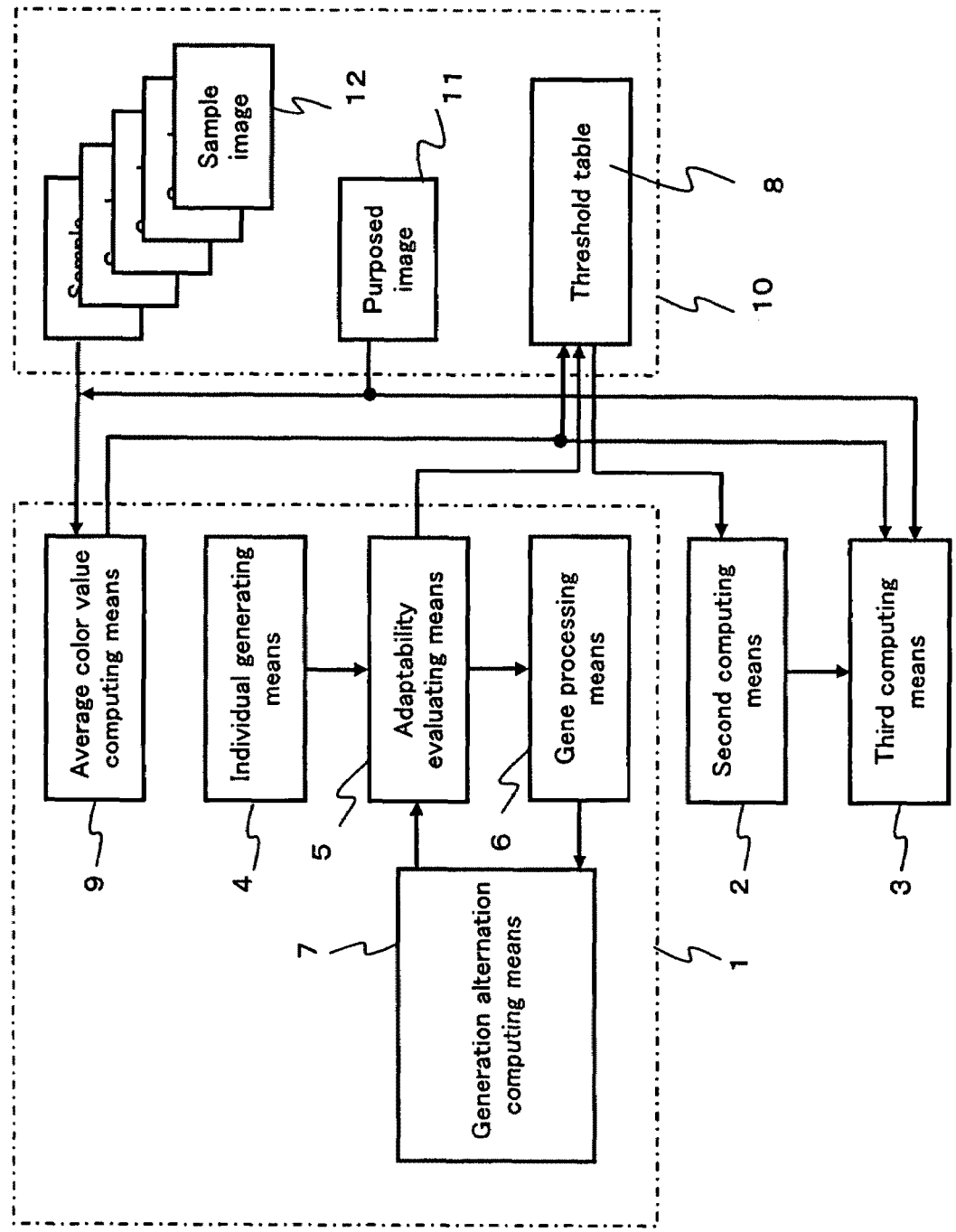
FIG. 1 is a block diagram of a region detecting apparatus of the present invention.

Functions of the region detecting apparatus are described below by dividing the functions into blocks. As shown in FIG. 1, the region detecting apparatus is constituted by an image data storing section 10 which is demarcated to the storage region of the hard disk and in which a sample image 12 and a purposed image 11 are stored, a first computing unit or means 1 high obtains extraction-region-identifying threshold data for a plurality of sample images 12 including a common extraction region but having average color values different from each other in accordance with a genetic algorithm, and generates a threshold table 8 for said average color values, a second computing unit or means 2 for adaptively computing the extraction-region-identifying threshold data for the purposed image 11 in accordance with the average color value of the purposed image and said threshold table 8, and a third computing unit or means 3 for detecting an extraction region in accordance with the threshold data computed by said second computing means 2.

According to the above configuration, it is possible to properly obtain extraction-region-identifying threshold data for various purposed images having photographing conditions different from each other and the recognition rate is improved. In this case, after a purposed-image threshold is set, it is only necessary to execute the threshold processing for detecting an extraction region for the purposed image. Therefore, it is possible to detect the extraction region at a very high speed.

The first computing means 1 is constituted by threshold data group generating unit or means 4 for initially generating a predetermined number of threshold data groups constituted by RGB threshold data at least for the first color-component region and the second color-component region adjacent to the first color-component region for characterizing extraction regions as the extraction-region-identifying threshold data, an adaptability evaluating unit or means 5 for evaluating adaptabilities of sample images of the generated threshold data groups, a gene processing unit or means 6 for generating new threshold data groups by performing selection in accordance with the evaluated adaptability and executing a crossing or mutating genetic engineering, and a generation alternating unit or means 7 of repeating said gene processing means 6 and the adaptability evaluating means 5 over set generations.

To apply a genetic algorithm, it is possible to aim at improvement of the recognition rate according to a color combination by setting at least RGB threshold data for the first color-component region and RGB threshold data for the second color-component region adjacent to the first color-component region for characterizing extraction regions as the extraction-region-identifying threshold data. That is, by setting a threshold in accordance with a combination of two or more adjacent colors for characterizing an extraction region, it is possible to unlimitedly reduce influences of background noises.

The gene processing means 6 is constituted so as to execute the crossing or mutating genetic engineering at a predetermined probability up to predetermined generations less than a preset number of generations, newly generate threshold data groups to be sufficient after selecting a predetermined number of threshold data groups starting with threshold data group having the highest adaptability out of the remaining threshold data groups in accordance with the elite strategy, execute the crossing or mutating genetic engineering at a predetermined probability in generations after a preset number of generations, and newly generate threshold data groups to be insufficient after selecting threshold data groups out of the remaining threshold data groups so that adaptabilities show a normal distribution, which is processed so as to generate threshold data groups using a value when each threshold data for the crossing or a pair of threshold data groups is obtained by the inverse ratio of adaptabilities as a new threshold.

That is, by executing the genetic engineering for selecting a predetermined number of threshold data groups starting with threshold data group having the highest adaptability in accordance with the elite strategy up to predetermined generations less than a preset number of generations, it is possible to securely leave effective genes and accelerate elimination of unnecessary genes.

Repeating selection to the end in accordance with the elite strategy is not preferable because a local solution may occur. However, generating a mutation in order to prevent the local solution is not preferable too because the solution tends to rather diverge.

Therefore, by executing the genetic engineering for selecting threshold data groups so that adaptabilities show a predetermined probability distribution, preferably a normal distribution in generations after the preset number of generations, it is possible to prevent the local solution from occurring and realize early convergence.

Moreover, in the case of the above crossing, it is possible to generate a threshold data group having a higher adaptability by generating a threshold data group using a value when the threshold data for each of a pair of threshold data groups is obtained by the inverse ratio of adaptabilities as a threshold.

The region detecting method of the present invention is described below by using a case of extracting the face of an unspecific person as an extraction region from a static image or a dynamic image as a purposed image by the above region detecting apparatus as an example.

In general, the face of a person in a static or a dynamic picture is expressed in a different color depending on a photographing condition (illumination) at that time even for the same person. Therefore, it is very complex to obtain a threshold for detecting a region in every photographing condition.

Therefore, the above-method uses Y-value in a $YC_rC_b$ color system defined as a color system in which a perceptual color difference of a person can be approximately expressed as a geometric distance, decides a value (RGB) closest to lip color for an unknown Y-value and a value (RGB) closest to skin color in accordance with a genetic algorithm, adaptively obtains thresholds of the lip and skin colors of a purposed image in accordance with the decided values, and detects a region to be extracted in accordance with the thresholds.

That is, when using said extracted region as the face region of a person, the first color-component region is assumed as a region corresponding to lip color and the second color-component region is assumed as a region corresponding to skin color.

Figure 2:
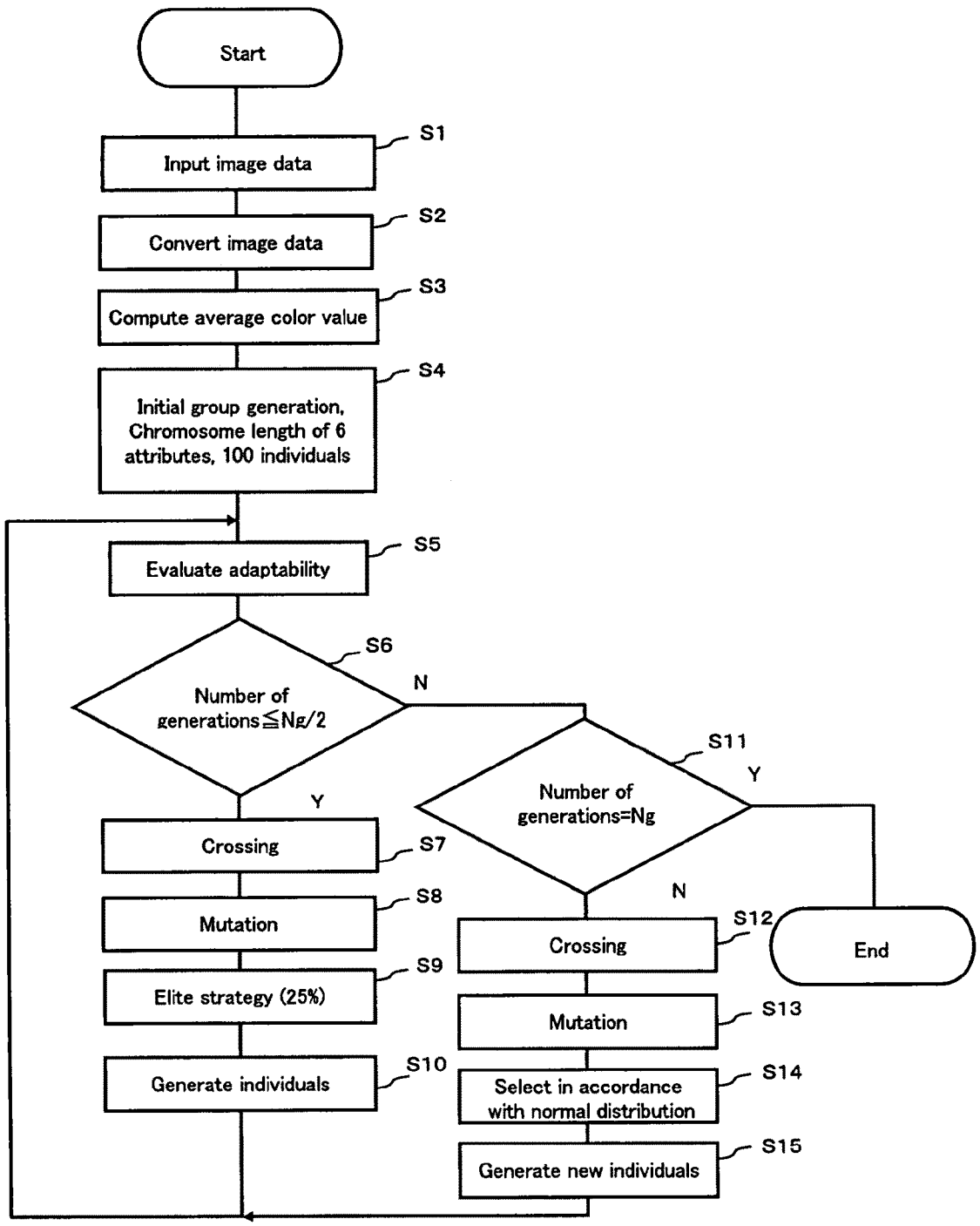
FIG. 2 is a flowchart for explaining a region detection procedure to be executed by a region detecting apparatus of the present invention.

A case of extracting faces of three persons photographed in the photographic image in FIG. 5A by using the photographic image as a purposed image is specifically described below in accordance with the flowchart shown in FIG. 2.

Figure 5A:
FIG. 5A is an illustration of a purposed image used in the examination.

A plurality of sample images for learning, photographed under various photographing conditions such as during daytime, light interruption by curtain, during nighttime, and use of different light sources is prepared for the purposed image shown in FIG. 5A and stored in the image data storing section 10 (S1). Though it is preferable that the sample images are in the same scene, there is no problem as long as the positions of objects are the same.

The sample images are converted from the RGB color system into $YC_rC_b$ color system in accordance with the following (Numerical Formula 1) by the average color value computing means 9 and the average value $Y_{AV}$ of color values Y values of the sample images is obtained (S2, and S3).

(Numerical Formula 1)

$$\begin{pmatrix} Y \\ Cr \\ Cb \end{pmatrix} = \begin{pmatrix} 0.29900 & 0.58700 & 0.11400 \\ 0.50000 & -0.41869 & -0.08131 \\ -0.16874 & 0.33126 & 0.50000 \end{pmatrix} \begin{pmatrix} R \\ G \\ B \end{pmatrix}$$

100 threshold data groups are generated as an initial group by said threshold data group generating unit or means 4. Factors of the threshold data groups are values obtained by defining thresholds of lip and skin colors with RGB and the $c^{th}$ gene of the $l^{th}$ threshold data group of the $k^{th}$ generation is expressed as I (k, l, c).

As shown in FIG. 6A, the $l^{th}$ gene is constituted by six attributes such as thresholds ($R_{ll}$, $G_{ll}$, $B_{ll}$) of lip color and thresholds ($R_{sl}$, $G_{sl}$, $B_{sl}$) of skin color and each attribute value is expressed by an actual number and initially generated as random numbers [0,255]. For example, the first gene I (1,1, 1)=$R_{11}$ of the first threshold data group of the first generation is generated as random numbers of [0,255]. By actual-number-coding an attribute value, it is not necessary to change the actual-number coding to the binary coding type and one threshold data group directly serves as a threshold. Therefore, it is possible to greatly reduce subsequent computing time (S4).

Adaptabilities for genes of the first generation generated by the threshold data group generating means 4 are evaluated by the adaptability evaluating means 5 (S5). Specifically, whether RGB data for pixels of lip and skin regions of a person previously cut out from a sample image is included in the range of the data in which the threshold RGB data for a lip and the threshold RGB data for a skin defined as the genes is provided with a range of several % is checked for every pixel. Then the rate of the coincident number of pixels to the number of pixels of the whole lip region (number of pixels included in a range of several %) is normalized between 0 and 1, and the rate of the coincident number of pixels to the number of pixels of the whole skin region (number of pixels included in a range of several %) is normalized between 0 and 1. Then a series of computing procedures for obtaining the product of the rates is defined as an evaluation function, and a value evaluated by the evaluation function is derived as the adaptability of each threshold data group.

It is determined by the generation alternation computing means 7 whether a result evaluated by the adaptability evaluating means 5 is a result reaching 50 generations which are half of the preset number of generations Ng (in the case of this embodiment, Ng is set to 100). When the result shows up to half generations, step S7 is started but when the result shows subsequent generations, step S11 is started. The processing is completed when the number of generations reaches the set generation Ng=100 and threshold data group having the adaptability 1 is obtained (S11).

Because the processing of the first generation is executed this time, step S7 is started and in this case, 25% of 100 threshold data groups are first generated as new threshold data groups of the next generation through crossing (S7), 2% of the threshold data groups are randomized as random numbers [0,255] so that any gene of 2% of the threshold data groups causes mutation (S8), then 25% of the threshold data groups are selected starting with threshold data group having the highest adaptability so that they are left in the next generation as elites (S9). Moreover, new threshold data groups of the next generation are generated as random numbers of [0,255] in order to maintain 100 threshold data groups (S10)

By the generation alternation computing means 7, the processing for evaluating an adaptability for threshold data group of the next generation generated through the gene processing is returned to step S5.

The crossing is described below. As shown in FIG. 6B, a value is generated as a new threshold that each threshold data for each of a pair of threshold data groups is obtained in accordance with the inverse ratio of adaptabilities. For example, to generate the lip threshold R component $R_{lp}$ of the $p^{th}$ gene of the $(k+1)^{th}$ generation by crossing the lip threshold R component $R_{lm}$ of genes of the $m^{th}$ threshold data group of the $k^{th}$ generation and the lip threshold R component $R_{ln}$ of genes of the $n^{th}$ threshold data group of the $k^{th}$ generation, when their adaptabilities are i and j ($0 \leq i, j \leq 1$), a new gene is obtained as $R_{lp}=j \cdot (R_{lm+Rln})/(i+j)$.

In the above step S11, before the number of generations reaches the preset number of generations Ng, 25% of 100 threshold data groups are first generated as new threshold data groups of the next generation through crossing by the gene processing means 6 (S12), 2% of the threshold data groups are randomized as random numbers of [0,255] so that any gene of the 2% of the threshold data groups cause mutation (S13), then threshold data groups to be left to the next generation are selected so that adaptabilities of threshold data groups evaluated by the adaptability evaluating means 5 become a normal distribution of N (a, σ2) (S14), and new threshold data groups of the next generation are generated as random numbers of [0,255] in order to maintain 100 threshold data groups (S15). Also in this case, the processing for evaluating adaptabilities for the threshold data groups of the next generation by the generation alternation computing means 7 is returned to step S5.

When the above-mentioned steps S5 to S14 are repeated and the number of generations reaches the preset number of generations Ng, by the generation alteration computing means 7 genes of threshold data groups which have adaptabilities of 1.0, that is, in which recognition rates of lip and skin become 100% are stored in the threshold data table 8 together with the average color value data computed in step S3 as the threshold data for the sample images. However, unless threshold data group having the adaptability 1 is obtained when reaching a set generation, steps S11 to S15 are further repeated every ten generations until threshold data group having the adaptability 1 is obtained.

Figure 3A:
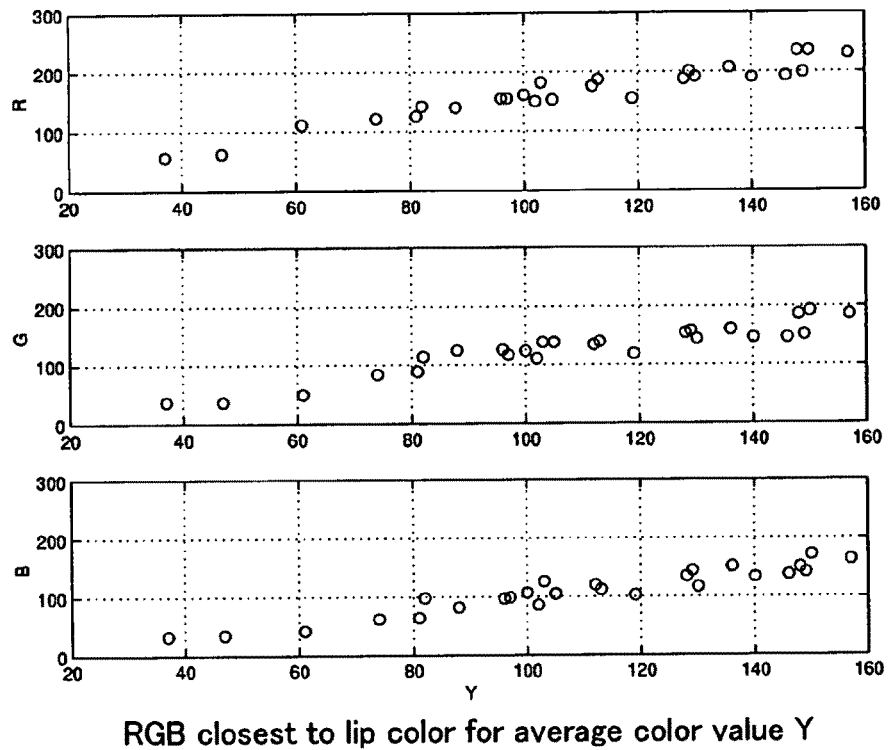
FIG. 3A is an illustration showing graphs of thresholds of RGB for an average color value obtained by a GA (genetic algorithm)
Figure 3B:
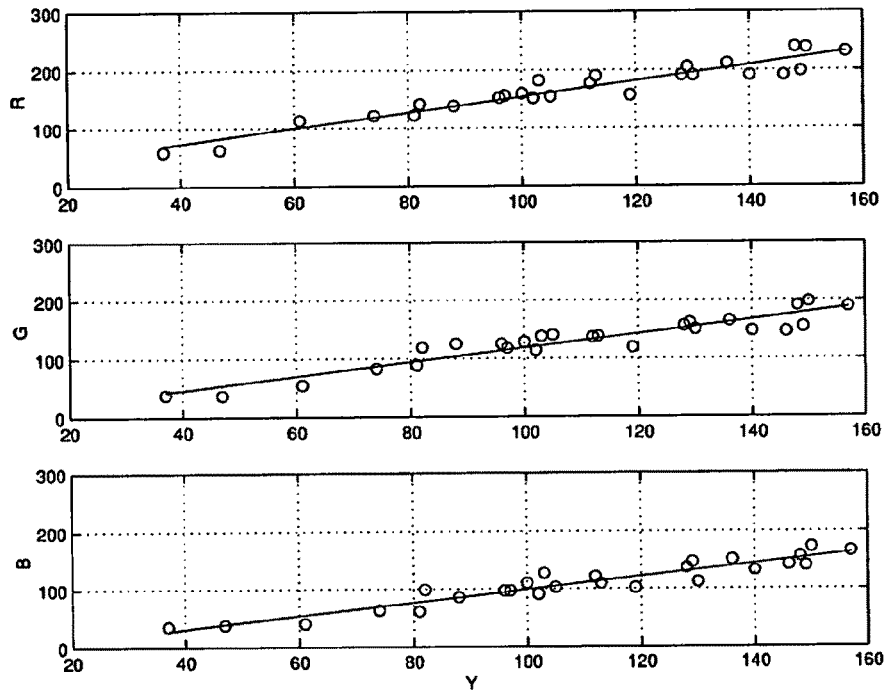
FIG. 3B is an illustration showing graphs of characteristic straight lines of RGB to be entered as the then table data.

The above processings from step S1 to step S15 are executed for each sample image and threshold data values for lip and skin for different average color values are stored in the threshold table 8. FIG. 3A is an illustration showing tables respectively obtained by plotting average color values of sample images and thresholds of RGB closest to lip color decided by a genetic algorithm for the sample images and FIG. 4B is an illustration showing tables respectively obtained by plotting average color values of sample images and the thresholds of RGB closest to skin color decided by a genetic algorithm for the sample images. FIGS. 3B and 4B respectively show a result of linearly approximating each data in accordance with the least square method. Finally, the characteristic straight lines are stored in said threshold table 8 as table data.

That is, a series of the above processings includes a common extraction region and serves as a first step of obtaining extraction-region-identifying threshold data for a plurality of sample images having average color values different from each other by a genetic algorithm.

Then, the average color value for the purposed image in FIG. 5A is computed by the second computing means 2 and the threshold data values for lip and skin colors for the computed average color value are obtained from said threshold table 8.

Figure 5B:
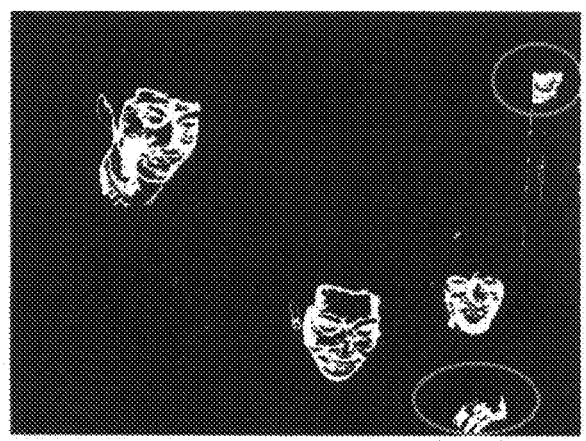
FIG. 5B is an illustration showing a detection result of only a skin region.
Figure 5C:
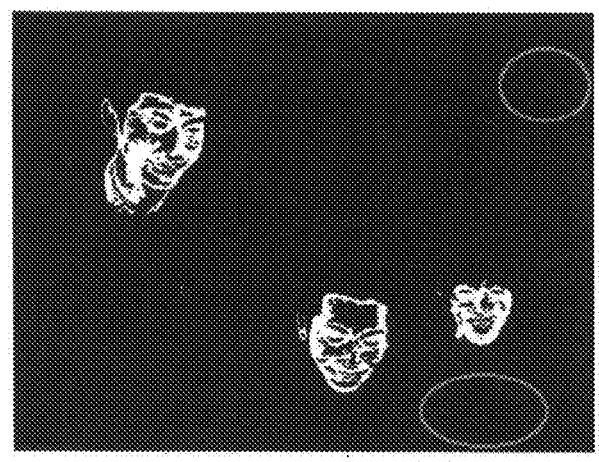
FIG. 5C is an illustration of a detection result of a region including skin and lip.

A lip region is first detected from the purposed image in accordance with the lip threshold data by the third computing means 3 to determine whether a skin region based on the skin threshold data is present in a region adjacent to the detected region. In this case, it is also allowed to first detect the skin region and then determine whether the lip region is included. As a result, as shown in FIG. 5C, it is clarified that it is possible to securely detect the face region of a person. In this case, when detecting only the skin region, a portion other than faces (portion enclosed by circle in FIG. 5B) is erroneously detected. However, by detecting the lip region together, it is confirmed that a region is properly detected at a probability of 90% or higher.

As described above, it is clarified that the color component ratio between lip and skin of a person shows a value specific to the person from an extracted face region but the ratio is not influenced by an external environment. That is, the color component ratio between lip and skin of the face of a person is not influenced by the condition of the person or illumination light but it is always constant. Therefore, by applying a minimum-distance classification method in accordance with the color component ratio, it is possible to identify a person.

Moreover, in the case of the above-mentioned embodiment, it is clarified that the processing for extracting the face region is completed in only 0.08 sec when using a color image of 640×480 pixels as a purposed image and it is demonstrated that the processing can be executed at a high recognition rate and a high speed.

In the case of the above-mentioned embodiment, a genetic algorithm is executed at a mutation rate of 2% for 100 generations and 100 threshold data groups. However, because these values are examples, values are not restricted to these values. It is possible to properly set these values in accordance with various conditions including the capacity of a purposed image.

For the above embodiment, a case is described in which generations half of a preset number of generations Ng (Ng=100) are regarded as predetermined generations when selecting a predetermined number of threshold data groups starting with threshold data group having the highest adaptability in accordance with an elite strategy up to predetermined generations less than the preset number of generations in the gene processing step. However, the predetermined generations are not restricted to half of the set number of generations but it is allowed to set the predetermined generations in a range approximately equal to the half of the set number of generations.

In the case of the above embodiment, a method and an apparatus for converting an RGB color system into a $YC_rC_b$ color system and computing a threshold in accordance with the average value of image color values are described. However, it is not always necessary to convert a color system into the $YC_rC_b$ color system. It is allowed to use another color system as long as the color system is able to obtain the average value of color values for an image. For example, it is also allowed to obtain an average color value from a value obtained by converting the RGB color system into an HSV color system which is one of Munsell color systems and in which hue is assumed as H, saturation is assumed as S, and color value is assumed as V or an HIS color system in which a color value is two times larger than the case of the HSV color system.

For the above embodiment, a case is described in which a normal distribution is used as a predetermined probability distribution. However, a probability distribution is not restricted to the above predetermined probability distribution. For example, it is possible to use an ϵ distribution.

Though the above embodiment is attempted with a static image, it is needless to say that the embodiment can be also applied to a dynamic image. Moreover, for the above embodiment, a case is described in which an extraction region is the face region of a person, the first color-component region is a region corresponding to a lip, and said second color-component region is a region corresponding to skin color. However, the extraction region is not restricted to the face region of a person but it is possible to properly set the extraction region.

For example, the present invention can be applied to detect a number-plate region from an image photographed by a vehicle photographing apparatus set on an expressway. By setting the first color-component region as a region corresponding to a color of the number in the number-plate (such as green) and the second color-component region as a region corresponding to a color of the number-plate (white or the like), it is possible to quickly detect the number-plate region without being influenced by a photographing condition such as weather. Thus, a vehicle can be quickly specified in accordance with a number on the number plate thus detected.

Then, an apparatus and a method capable of identifying a person by using a minimum distance classifying method in accordance with the face region of the person detected by the above-mentioned method is described below. A person identifying apparatus is constituted by including the above region detecting apparatus, a fourth computing unit or means for computing a color-component ratio between lip and skin for each of RGB data values for the face region detected by the region detecting apparatus, and a person identifying unit or means for identifying a person by using the minimum distance classifying method in accordance with the color component ratio obtained from the fourth computing means.

Figure 7:
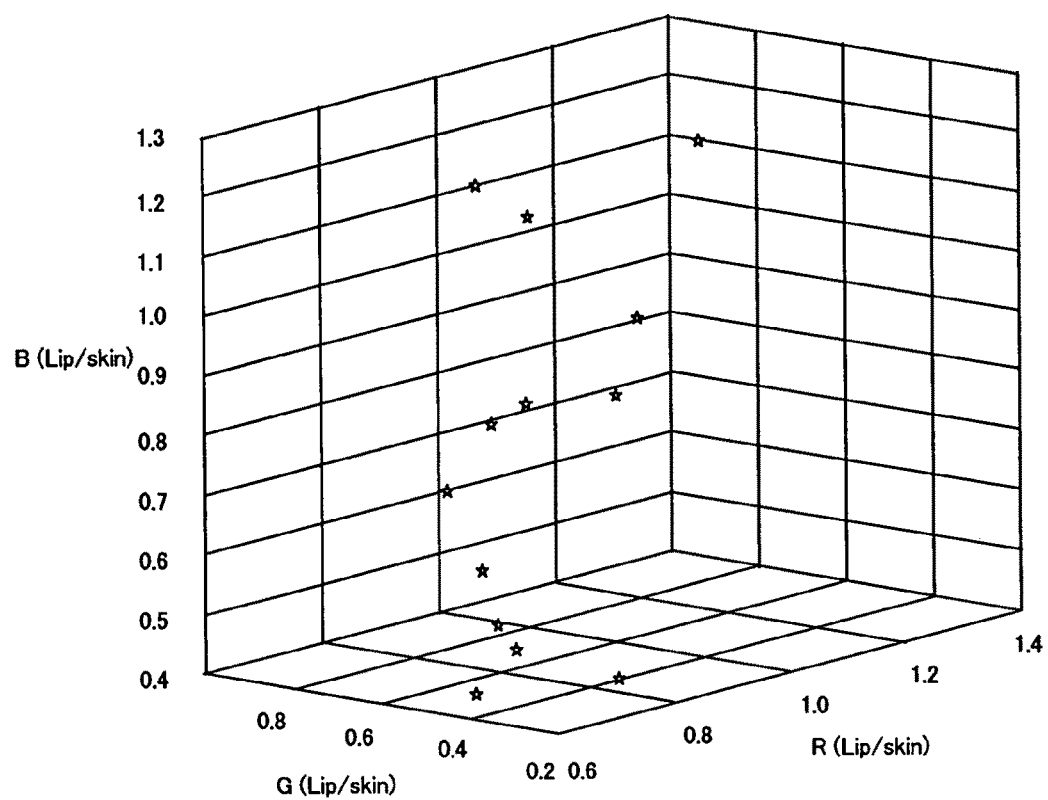
FIG. 7 is a distribution chart showing results of calculating ratios of lip color information to skin color information on RGB.

The fourth computing means computes the ratio of (lip color information/skin color information) for each of RGB in accordance with the skin color information (average value of pixels of RGB) and lip color information (average value of pixels of RGB) on a plurality of persons from the face regions detected from a plurality of purposed images to generate the distribution chart as shown in FIG. 7.

That is, persons in purposed images are previously entered (in this case, 13 persons are entered). The ratio of (lip color information/skin color information) is computed for each of RGB in accordance with the skin color information and lip color information from the face region similarly detected from an unknown image. The person identifying means identifies that the ratio of (lip color information/skin color information) of an unknown person computed by the fourth computing means coincides with that of an entered person when the ratio coincides with the distribution chart shown in FIG. 7.

In this case, the distance of each of RGB is computed in values of (lip color information/skin color information) and a person for whom the total distance becomes 1 or more is regarded as a misrepresented person. As a result of applying the above simulation to 100 images, 13 entered persons are correctly recognized in 86 images. However, persons other than entered persons are not recognized as entered persons.

As described above, according to the present invention, it is possible to provide a region detecting apparatus and a region detecting method capable of setting a proper threshold independently of a photographing condition and moreover, quickly and accurately detecting a specific region such as the face region.

What is claimed is:

1. A region detecting method based on a method of deciding a threshold value, comprising:

an input step of an input interface section inputting a plurality of sample images and a targeted image and storing the plurality of sample images and the targeted image in a storing section;

a first step of a processor obtaining extraction-region-identifying threshold data for identifying an extraction region for the plurality of sample images including a common extraction region but having average color values different from each other in accordance with an algorithm;

said first step including a threshold data group generating step of the processor initially generating a predetermined number of threshold data groups constituted by at least RGB threshold data for a first color-component region and RGB threshold data for a second color-component region adjacent to the first color-component region for characterizing the extraction region as the extraction-region-identifying threshold data for identifying the extraction region, an adaptability evaluating step of the processor evaluating an adaptability for the sample images of the generated threshold data groups, a gene processing step of the processor generating new threshold data groups by executing at least one of a crossing operation and a mutation operation and selecting the new threshold data groups in accordance with the adaptability evaluated in said adaptability evaluating step, a threshold data group supplying step of the processor generating additional threshold data groups to maintain a number of the threshold data groups equal to a number of the threshold data groups generated in said threshold data group generating step, and a generation alternating step of the processor repeating said gene processing step, said adaptability evaluating step and said threshold data group supplying step over set generations;

a second step of the processor adaptively computing the extraction-region-identifying threshold data for identifying the extraction region for the targeted image in accordance with average color values of the targeted image and a relation between the thresholds and the average color values obtained in said first step;

a third step of the processor detecting the extraction region in accordance with the threshold data computed in said second step; and an output step of the processor outputting the extraction region detected in said third step to an output interface section.

2. A region detecting apparatus based on a method of deciding a threshold value, comprising:

an input interface section for inputting a plurality of sample images and a targeted image and storing the plurality of sample images and the targeted image in the storing section;

a first computing unit obtaining extraction-region-identifying threshold data for identifying an extraction region for the plurality of sample images including a common extraction region but having average color values different from each other in accordance with an algorithm and generating a threshold table for the average color values;

said first computing unit including a threshold data group generating unit initially generating threshold data groups constituted by at least RGB threshold data for a first color-component region and RGB threshold data for a second color-component region adjacent to the first color-component region for characterizing the extraction region, an adaptability evaluating unit evaluating an adaptability for the sample images of the generated threshold data groups, a gene processing unit generating new threshold data groups by executing at least one of a crossing operation and a mutation operation and selecting the new threshold data groups in accordance with the adaptability evaluated in said adaptability evaluating unit, threshold data group supplying unit generating additional threshold data groups to maintain a number of the threshold data groups equal to a number of the threshold data groups generated in said threshold data group generating unit, and a generation alternation computing unit repeating operations performed by said gene processing unit, said adaptability evaluating unit and said threshold data group supplying unit over set generations;

a second computing unit adaptively computing the extraction-region-identifying threshold data for identifying the extraction region for the targeted image in accordance with average color value of the targeted image and a threshold table;

a third computing unit detecting the extraction region in accordance with the threshold data computed by said second computing unit; and an output interface section for outputting the extraction region detected by said third computing unit to a computer.

3. A region detecting apparatus based on a method of deciding a threshold value, comprising:

an input interface section for inputting a plurality of sample images and a targeted image and storing the plurality of sample images and the targeted image in the storing section;

a first computing unit obtaining extraction-region-identifying threshold data for identifying an extraction region for the plurality of sample images including a common extraction region but having average color values different from each other in accordance with an algorithm and generating a threshold table for the average color values;

said first computing unit including a threshold data group generating unit initially generating a predetermined number of threshold data groups constituted by at least RGB threshold data for a first color-component region and RGB threshold data for a second color-component region adjacent to the first color-component region for characterizing the extraction region, an adaptability evaluating unit evaluating an adaptability for the sample images of the generated threshold data groups, a gene processing unit generating new threshold data groups by executing at least one of a crossing operation and a mutation operation and selecting the new threshold data groups in accordance with the adaptability evaluated in said adaptability evaluating unit, a threshold data group supplying unit generating additional threshold data groups to maintain a number of the threshold data groups equal to a number of the threshold data groups generated in said threshold data group generating unit, and a generation alternation computing unit repeating operations performed by said gene processing unit, said adaptability evaluating unit and said threshold data group supplying unit over set generations;

a second computing unit adaptively computing the extraction-region-identifying threshold data for identifying the extraction region for the targeted image in accordance with average color value of the targeted image and a threshold table;

a third computing unit detecting the extraction region in accordance with the threshold data computed by said second computing unit; and an output interface section for outputting the extraction region detected by said third computing unit.

* * * * *